(12) United States Patent
Imaizumi

(10) Patent No.: US 9,513,694 B2
(45) Date of Patent: Dec. 6, 2016

(54) INFORMATION PROCESSING APPARATUS AND POWER-SOURCE SWITCHING METHOD

(71) Applicant: Yuuki Imaizumi, Kanagawa (JP)

(72) Inventor: Yuuki Imaizumi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 440 days.

(21) Appl. No.: 14/052,964

(22) Filed: Oct. 14, 2013

(65) Prior Publication Data

US 2014/0136009 A1  May 15, 2014

(30) Foreign Application Priority Data

Nov. 15, 2012 (JP) ................................. 2012-251674

(51) Int. Cl.
| | |
|---|---|
| G05F 1/66 | (2006.01) |
| G06F 1/32 | (2006.01) |
| G06K 15/00 | (2006.01) |
| H04N 1/00 | (2006.01) |

(52) U.S. Cl.
CPC ......... *G06F 1/3284* (2013.01); *G06K 15/4055* (2013.01); *H04N 1/00896* (2013.01); *H04N 1/00901* (2013.01); *H04N 1/00904* (2013.01); *Y02B 60/1267* (2013.01); *Y02B 60/32* (2013.01)

(58) Field of Classification Search
CPC .............. G06F 1/3284; H04N 1/00896; H04N 1/00904; H04N 1/00901; G06K 15/4055; Y02B 60/1267; Y02B 60/32
See application file for complete search history.

(56) References Cited

U.S. PATENT DOCUMENTS

| | | | | |
|---|---|---|---|---|
| 7,254,353 B2* | 8/2007 | Koyama | ............ | G03G 15/2039 399/69 |
| 7,257,341 B2* | 8/2007 | Hanamoto | ......... | G03G 15/2039 399/67 |
| 7,260,337 B2* | 8/2007 | Koyama | ............ | G03G 15/5004 399/67 |
| 7,277,651 B2* | 10/2007 | Hanamoto | ......... | G03G 15/2039 399/69 |

(Continued)

FOREIGN PATENT DOCUMENTS

| | | |
|---|---|---|
| JP | 2002-078196 | 3/2002 |
| JP | 2002-127553 | 5/2002 |

(Continued)

*Primary Examiner* — Charles Kasenge
(74) *Attorney, Agent, or Firm* — Oblon, McClelland, Maier & Neustadt, L.L.P.

(57) ABSTRACT

An information processing apparatus includes: an electric-power generating unit that generates electric power; an electric storage unit that stores electric power generated by the electric-power generating unit; and a control unit that, while in an energy-saving waiting mode in which the apparatus is in a waiting state to wait for an input of a job and in which electric power is supplied from the electric storage unit and, when the input job is for a predetermined low operation that has low power consumption, causes electric power to be supplied from the electric storage unit only to a section that is used for the low operation and that, when the input job is a job other than the job of the low operation, selects power being supplied from a commercial power source, and executes the job by using a section to which the selected electric power is supplied.

8 Claims, 8 Drawing Sheets

(56) References Cited

U.S. PATENT DOCUMENTS

| | | | | |
|---|---|---|---|---|
| 8,683,235 B2* | 3/2014 | Yokoyama | ................ | H02J 7/34 |
| | | | | 713/300 |
| 8,705,059 B2* | 4/2014 | Sekido | ................... | G03G 15/80 |
| | | | | 358/1.13 |
| 8,769,324 B2* | 7/2014 | Narushima | ........ | G03G 15/5004 |
| | | | | 713/323 |
| 2005/0169655 A1* | 8/2005 | Koyama | ............ | G03G 15/2039 |
| | | | | 399/69 |
| 2005/0169657 A1* | 8/2005 | Hanamoto | ......... | G03G 15/2039 |
| | | | | 399/88 |
| 2005/0169658 A1* | 8/2005 | Hanamoto | ......... | G03G 15/2039 |
| | | | | 399/88 |
| 2005/0169659 A1* | 8/2005 | Koyama | ............ | G03G 15/5004 |
| | | | | 399/88 |
| 2011/0252247 A1* | 10/2011 | Yokoyama | ................ | H02J 7/34 |
| | | | | 713/300 |
| 2011/0320842 A1 | 12/2011 | Narushima et al. | | |
| 2012/0026524 A1* | 2/2012 | Sekido | ................... | G03G 15/80 |
| | | | | 358/1.13 |
| 2012/0212050 A1 | 8/2012 | Takehara | | |
| 2013/0219198 A1* | 8/2013 | Kuroishi | ............ | H04N 1/00896 |
| | | | | 713/310 |

FOREIGN PATENT DOCUMENTS

| | | |
|---|---|---|
| JP | 2003-094770 | 4/2003 |
| JP | 2003-316558 | 11/2003 |
| JP | 2005-186425 | 7/2005 |
| JP | 2011-082277 | 4/2011 |
| JP | 2011-199983 | 10/2011 |
| JP | 2012-016096 | 1/2012 |
| JP | 2012-120272 | 6/2012 |

* cited by examiner

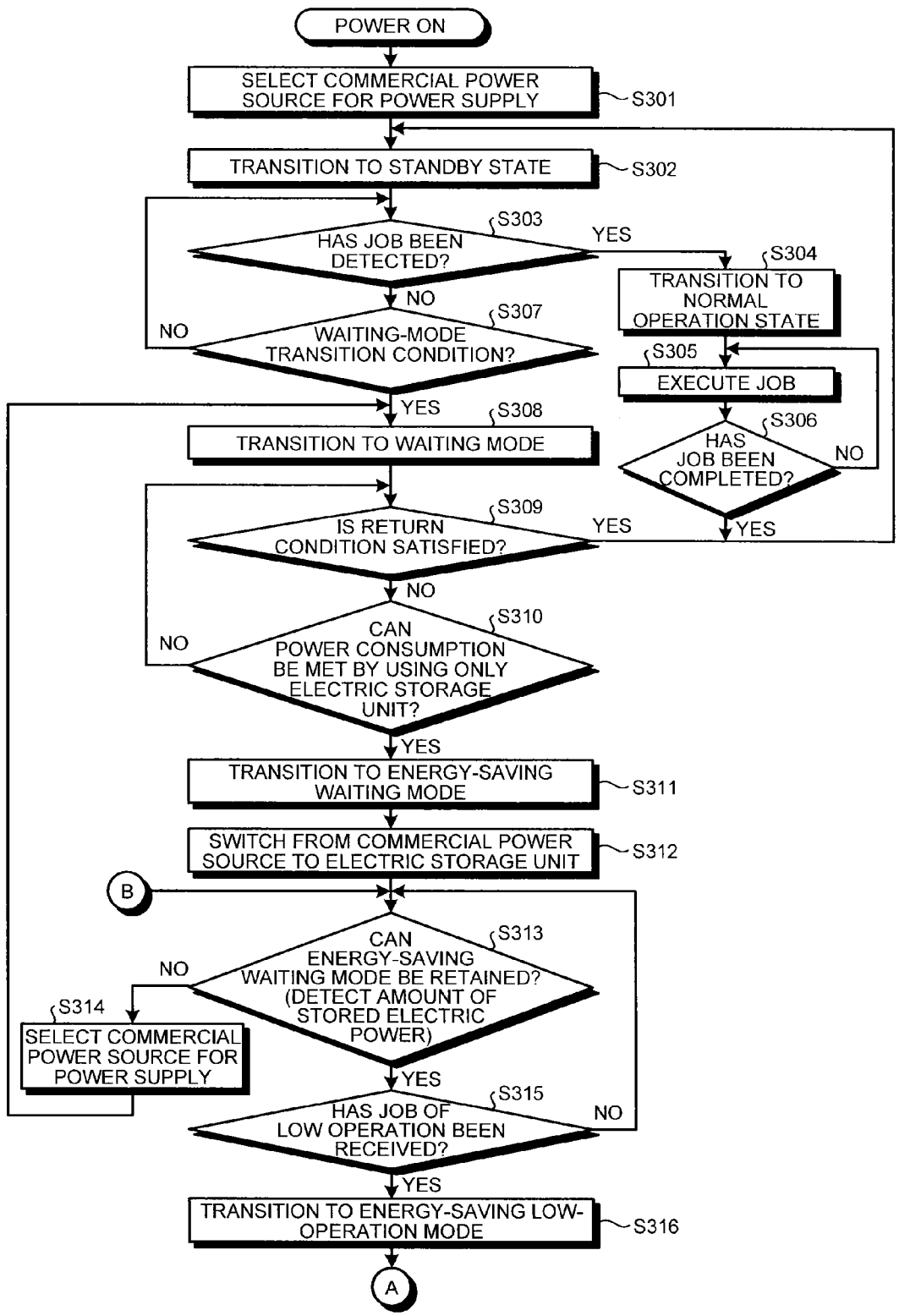

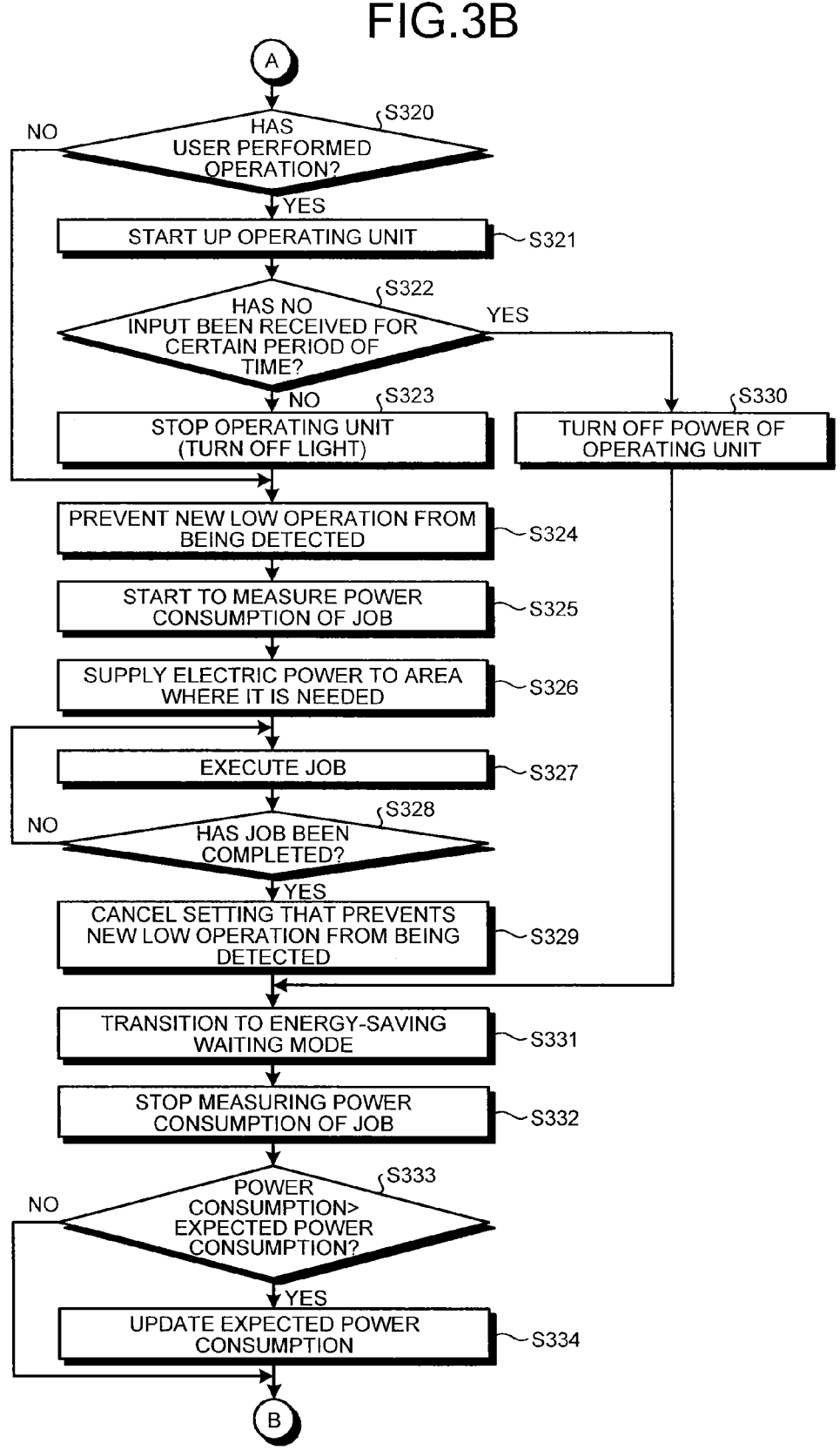

INFORMATION PROCESSING APPARATUS AND POWER-SOURCE SWITCHING METHOD

CROSS-REFERENCE TO RELATED APPLICATIONS

The present application claims priority to and incorporates by reference the entire contents of Japanese Patent Application No. 2012-251674 filed in Japan on Nov. 15, 2012.

BACKGROUND OF THE INVENTION

1. Field of the Invention

The present invention relates to an information processing apparatus and a power-source switching method.

2. Description of the Related Art

In order to reduce the power consumption that occurs during the time period in which image processing apparatuses, typically multifunction peripherals, are not actually in operation, the image processing apparatuses have multiple power states, such as a standby state or energy-saving waiting mode, and the power states are changed as appropriate depending on the usage of the apparatus. There has been a recent increase in the demand for apparatuses to save energy, and technologies are already known in which an electric-power generating device, typically a solar panel, and a battery are used in combination so that the power consumption taken from a commercial power source is reduced in order to achieve energy savings when in a waiting mode (while the apparatuses are not in use).

For example, Japanese Patent Application Laid-open No. 2012-16096 discloses an image processing apparatus that has a configuration in which, while in the waiting mode, the power supply from a commercial power source and the power supply from a battery are switched between depending on the remaining amount of electric power stored in the battery.

With the above-described conventional configuration, however, when a job command is received while in the waiting mode, a switchover is made to the power being supplied from the commercial power source even though there is a sufficient amount of electric power stored in the battery. Therefore, the advantage of reducing power consumption is applied only in cases in which the waiting state is set and thus there are expectations of further improvements in power saving.

Therefore, there is needed to provide an information processing apparatus that can achieve further power savings.

SUMMARY OF THE INVENTION

It is an object of the present invention to at least partially solve the problems in the conventional technology.

According to the present invention, there is provided: an information processing apparatus including an electric-power generating unit configured to generate electric power; an electric storage unit configured to store therein the electric power generated by the electric-power generating unit; and a control unit configured to select as an electric power source the electric storage unit or a commercial power source to supply electric power into the information processing apparatus from the electric storage unit or the commercial power.

In the above-mentioned information processing apparatus, while in an energy-saving waiting mode in which the information processing apparatus is in a waiting state to wait for an input of a job, the control unit selects as the electric power source the electric storage unit, when the input job is for a predetermined low operation that has low power consumption, the control unit supplies the electric power from the electric storage unit only to a section that is used for the low operation, when the input job is a job other than the job of the low operation, the control unit selects as the electric power source the commercial power source, and the control unit executes the input job by using a section to which the electric power is supplied from the electric storage unit or the commercial power source.

The present invention also provides a power-source switching method performed by an information processing apparatus including an electric-power generating unit configured to generate electric power; an electric storage unit configured to store electric power generated by the electric-power generating unit; and a control unit configured to select as electric power source the electric storage unit or a commercial power source to supply electric power into the information processing apparatus from the electric storage unit or the commercial power.

In the above-mentioned power-source switching method, the power-source switching method comprises: while in an energy-saving waiting mode in which the information processing apparatus is in a waiting state to wait for an input of a job, selecting, by the control unit, as the electric power source the electric storage unit, when the input job is for a predetermined low operation that has low power consumption, causing, by the control unit, the electric power supplied from the electric storage unit only to a section that is used for the low operation and, when the input job is a job other than the job of the low operation, selecting, by the control unit, as the electric power source the commercial power source; and executing, by the control unit, the input job by using a section to which the electric power is supplied from the electric storage unit or the commercial power source.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3A is a diagram that illustrates the flow of the process to control a switchover of the power source in the image processing apparatus according to the embodiment in a case where the transition to the normal low-operation mode is not provided;

FIG. 3B is a diagram that illustrates the flow of the process to control a switchover of the power source in the image processing apparatus according to the embodiment in a case where the transition to the normal low-operation mode is not provided;

DETAILED DESCRIPTION OF THE PREFERRED EMBODIMENTS

Figure 1:
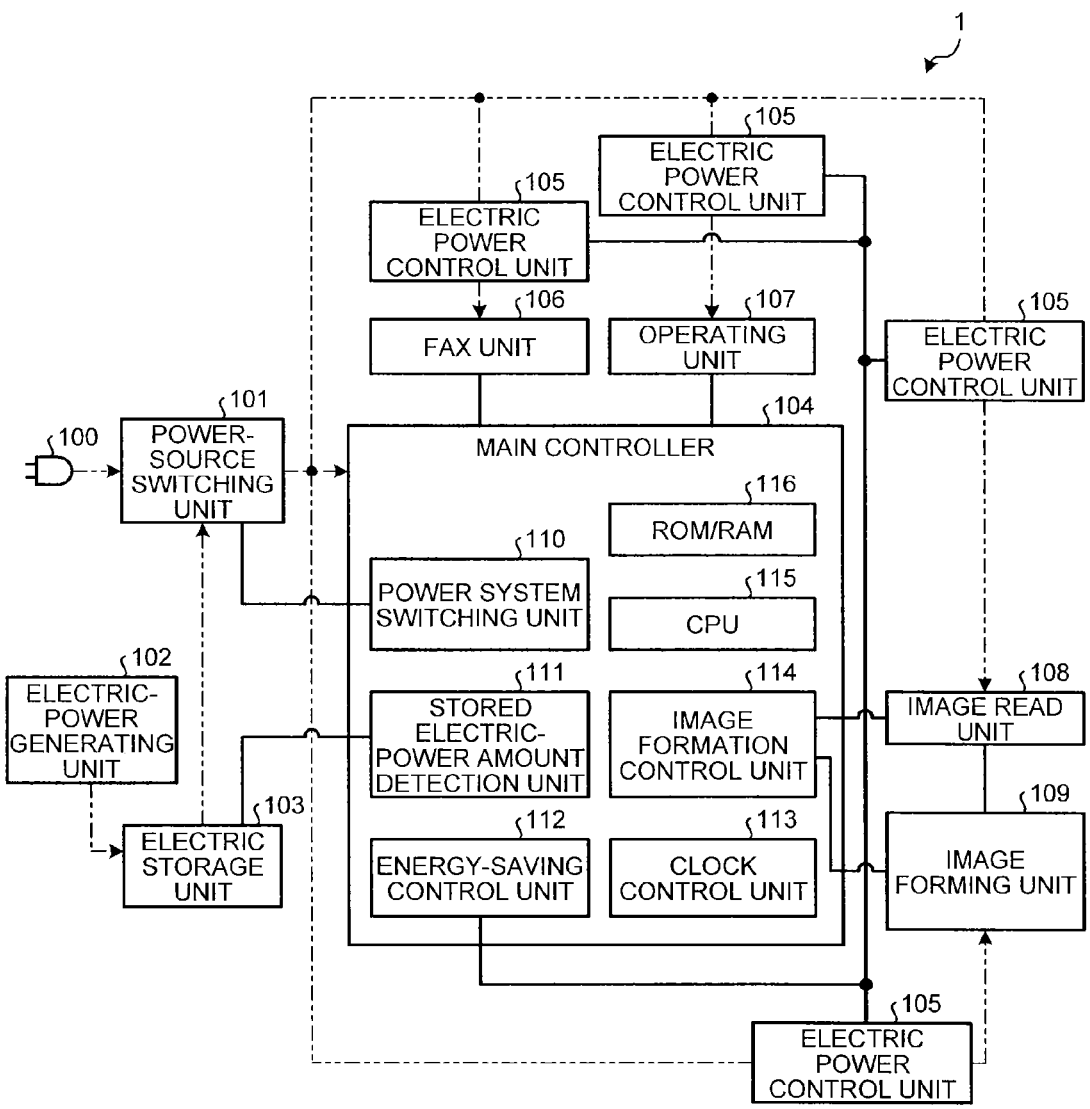
FIG. 1 is a diagram that illustrates the hardware configuration of an image processing apparatus according to an embodiment.

An explanation is given below, with reference to the drawings, of an embodiment in which an information processing apparatus according to the present invention is embodied as an image processing apparatus, typically a multifunction peripheral. FIG. 1 is a diagram that illustrates functional configurations of an image processing apparatus 1. As illustrated in FIG. 1, the image processing apparatus 1 includes an power source switching unit 101, an electric-power generating unit 102, an electric storage unit 103, a main controller (control unit) 104, a electric power control unit 105, a FAX unit 106, an operating unit 107, an image read unit 108, and an image forming unit 109.

The power source switching unit 101 controls the switching between the electric power supply from a commercial power source 100 and the electric power supply from the electric storage unit 103. The power source switching unit 101 switches the power supply such that the electric power supplied to each unit is prevented from being temporarily cut off during switching. The electric-power generating unit 102 is a power generating device that includes, for example, solar cells, or the like, and that is capable of independently generating electricity even if electric power is not supplied from the commercial power source 100. The electric storage unit 103 stores the electric power generated by the electric-power generating unit 102 and, when the electric power is not supplied from the commercial power source 100, supplies the electric power to each unit.

The main controller 104 controls each control of the functional configurations of the image processing apparatus 1. In the present embodiment, the main controller 104 includes a power system switching unit 110, a stored electric-power amount detection unit 111, an energy-saving control unit 112, a clock control unit 113, an image formation control unit 114, a CPU 115, and ROM/RAM 116.

The power system switching unit 110 controls the electric power supply to the image processing apparatus 1. Specifically, the power system switching unit 110 determines whether the electric power is to be supplied from the electric storage unit 103 or from the commercial power source 100 in accordance with the expected value of the power consumption (hereafter, referred to as the "expected power consumption") that is required to operate the image processing apparatus 1 and in accordance with the value of the remaining amount of electric power in the electric storage unit 103 (hereafter, referred to as the "amount of stored electric power"). The stored electric-power amount detection unit 111 detects the amount of electric power stored in the electric storage unit 103. Furthermore, the stored electric-power amount detection unit 111 calculates the expected power consumption that is required to execute a job. The energy-saving control unit 112 determines whether the electric power is to be supplied to each device depending on the power transition state of the image processing apparatus 1 or the operating status thereof. Moreover, the electric power supply within the main controller 104 is also controlled. The clock control unit 113 controls the frequency of the clock that is fed to the main controller 104. Furthermore, during the energy-saving waiting time, the clock control unit 113 stops the clocks from being supplied to the modules other than the modules needed. The operation of each device is executed in synchronized timing with the frequency of the supplied clock. The image formation control unit 114 controls the image read unit 108 and the image forming unit 109 in the image processing apparatus 1. The CPU 115 controls each module in the main controller 104 and also sets various parameters to be used for control and then stores them in the ROM/RAM 116. The ROM/RAM 116 store various types of data for the main controller 104.

The electric power control unit 105 is connected to the FAX unit 106, the operating unit 107, the image read unit 108, and the image forming unit 109 so as to control the power supply to the connected unit. The electric power control unit 105 performs control in accordance with a command from the energy-saving control unit 112 and, if a connected device is not in use during the requested operation, turns off the power supply. The FAX unit 106 controls fax communication. The operating unit 107 is used when a user operates the image processing apparatus 1. The image read unit 108 reads images and principally includes an optical unit, motor, and the like. The image forming unit 109 performs predetermined image processing so as to output read images or images transmitted from the FAX unit 106, or the like. The image forming unit 109 includes an image output unit (plotter).

Figure 2:
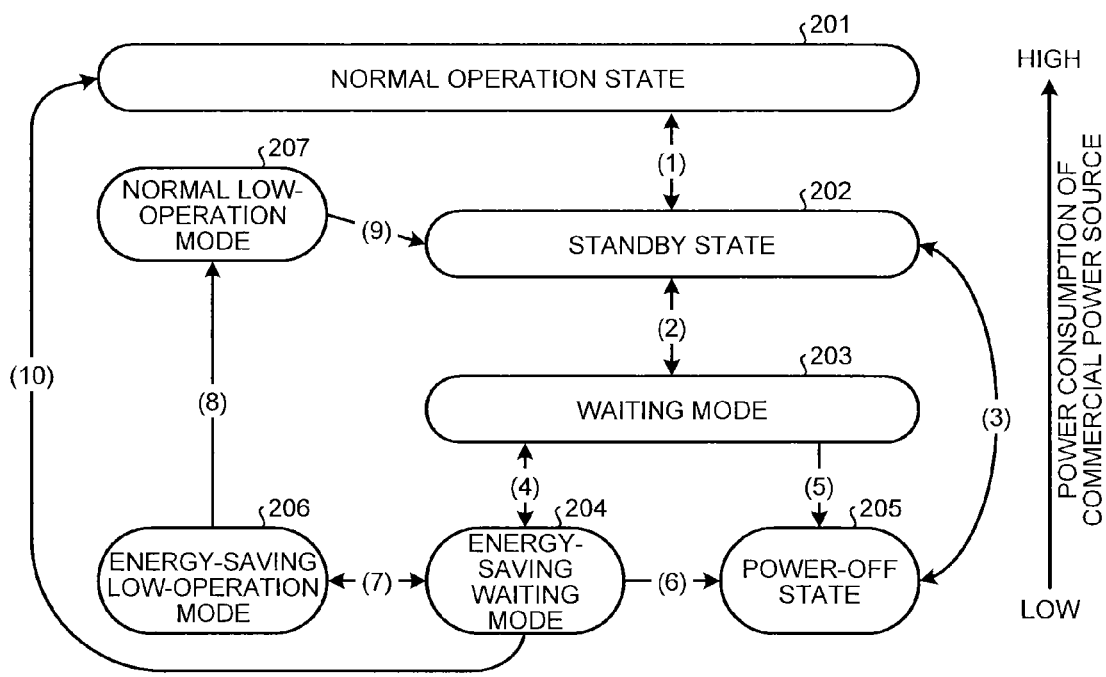
FIG. 2 is a diagram that illustrates the power transition of the image processing apparatus according to the embodiment.

Next, an explanation is given, with reference to FIG. 2, of the power transition states of the image processing apparatus 1 according to the present embodiment. As illustrated in FIG. 2, the image processing apparatus 1 is set to various power transition states, i.e., a normal operation state 201, a standby state 202, a waiting mode 203, an energy-saving waiting mode 204, a power-off state 205, an energy-saving low-operation mode 206, and a normal low-operation mode 207. The normal operation state 201 is an electric power state in which each job (a printing operation, scanning operation, or the like) is executed and in which the electric power is supplied from the commercial power source 100. The standby state 202 is an electric power state in which a device is waiting for a job command and in which the electric power is supplied from the commercial power source 100. The standby state 202 can immediately transition to the normal operation state 201.

The waiting mode 203 is a state in which the supply of the electric power is stopped for the components other than the main components so that the power consumption of the apparatus is reduced and in which the minimum of functions, such as network response or sensor input, are operating. When a return condition is satisfied while in this state, e.g., when a job command is received, a transition to the standby state 202 is made. Furthermore, the waiting mode 203 is directly changed to the normal operation state 201 via the standby state 202 depending on the return condition. In the waiting mode 203, the electric power is supplied from the commercial power source 100.

The energy-saving waiting mode 204 is the same as the waiting mode 203 in regard to the state of the electric power applied and the operation thereof; however, they are different from each other in that, in the energy-saving waiting mode 204, the electric power is supplied from the electric storage unit 103 to each device. The power-off state 205 is a state where the power of the image processing apparatus 1 is off. At this time, the power supply is stopped. The energy-saving low-operation mode 206 is a state where the electric power is supplied from the electric storage unit 103 and where the image processing apparatus 1 is in operation. The transition to the energy-saving low-operation mode 206 is made depending on the amount of electric power stored in the electric storage unit 103 when a job of an operation that can be performed with low power consumption (hereafter, referred to as a "low operation") is designated, e.g., when only the operating unit 107 is operated, or when only a scanning operation is performed by the image read unit 108. The energy-saving low-operation mode 206 can only transition from the energy-saving waiting mode 204. If the amount of electric power stored in the electric storage unit 103 becomes low during the energy-saving low operation, the energy-saving low-operation mode 206 can transition to the normal low-operation mode 207. The normal low-operation mode 207 is a state where, if the amount of electric power stored becomes low while in the energy-saving low-operation mode 206, the electric power is supplied from the commercial power source 100 so that the low operation is performed. Because the area to which the electric current is applied during the normal low-operation mode 207 is smaller than that during the normal operation state 201, the power consumption during the normal low-operation mode 207 is less than that during the normal operation.

Next, an explanation is given of the transition time of each of the above-described power transition states.

(1) Transition between the Normal Operation State 201 and the Standby State 202

When any job is received while in the standby state 202, the standby state 202 transitions to the normal operation state 201. Furthermore, when the selected job is completed while in the normal operation state 201, the normal operation state 201 transitions to the standby state 202.

(2) Transition between the Standby State 202 and the Waiting Mode 203

If no operation is received for more than a certain period of time or when the energy-saving key included in the operating unit 107 is pressed while in the standby state 202, the standby state 202 transitions to the waiting mode 203. Furthermore, when a job is received or when the energy-saving key is pressed again while in the waiting mode 203, the waiting mode 203 transitions to the standby state 202.

(3) Transition between the Standby State 202 and the Power-off State 205

When the power key is pressed while in the standby state 202, the standby state 202 transitions to the power-off state 205. Moreover, when the power key is pressed while in the power-off state 205, the power-off state 205 transitions to the standby state 202.

(4) Transition between the Waiting Mode 203 and the Energy-saving Waiting Mode 204

If the amount of electric power stored in the electric storage unit 103 is equal to or greater than a predetermined threshold while in the waiting mode 203, the waiting mode 203 transitions to the energy-saving waiting mode 204. Furthermore, when the condition for returning to the waiting mode 203 is received or when the amount of electric power stored in the electric storage unit 103 is less than a predetermined threshold, the energy-saving waiting mode 204 transitions to the waiting mode 203.

(5) Transition between the Waiting Mode 203 and the Power-off State 205

When the power key is pressed while in the waiting mode 203, the waiting mode 203 transitions to the power-off state 205. When the power key is pressed while in the power-off state 205, the power-off state 205 transitions to the standby state 202 and does not transition to the waiting mode 203.

(6) Transition between the Energy-saving Waiting Mode 204 and the Power-off State 205

When the power key is pressed while in the energy-saving waiting mode 204, the energy-saving waiting mode 204 transitions to the power-off state 205. When the power key is pressed while in the power-off state 205, the power-off state 205 transitions to the standby state 202 and does not transition to the energy-saving waiting mode 204.

(7) Transition between the Energy-saving Low-operation Mode 206 and the Energy-saving Waiting Mode 204

When the return condition is received, e.g., a job command is received while in the energy-saving waiting mode 204 and when the amount of electric power stored in the electric storage unit 103 is sufficient to perform a low operation, the energy-saving waiting mode 204 transitions to the energy-saving low-operation mode 206. When the low operation is finished, the energy-saving low-operation mode 206 transitions to the energy-saving waiting mode 204.

(8) Transition between the Energy-saving Low-operation Mode 206 and the Normal Low-operation Mode 207

If the amount of electric power stored in the electric storage unit 103 is less than a predetermined threshold for some reason while the low operation is being performed in the energy-saving low-operation mode 206, the energy-saving low-operation mode 206 transitions to the normal low-operation mode 207. If the transition to the normal low-operation mode 207 is made, the normal low-operation mode 207 does not transition to the energy-saving low-operation mode 206 because the amount of stored electric power is insufficient.

(9) Transition between the Normal Low-operation Mode 207 and the Standby State 202

When the low operation is completed, the normal low-operation mode 207 transitions to the standby state 202.

(10) Transition from the Energy-saving Waiting Mode 204 to the Normal Operation State 201

When the expected power consumption that is needed for the job of the designated low operation is greater than the amount of electric power stored in the electric storage unit 103, the power supply from the commercial power source 100 is selected and the apparatus is operated in the normal operation state 201. Moreover, when a job other than that for a low operation is designated while in the energy-saving waiting mode 204, the energy-saving waiting mode 204 transitions to the normal operation state 201.

Next, an explanation is given, with reference to FIGS. 3A and 3B, of the flow of the control performed by the image processing apparatus 1 according to the present embodiment. The normal low-operation mode 207 illustrated in FIG. 2 is not included in the examples of FIGS. 3A and 3B, and FIGS. 3A and 3B illustrate a case where all of the low operations are controlled by the electric power supplied from the electric storage unit 103. As illustrated in FIG. 3A, the power switch is first pressed so that the subsequent operation is started, and when the power of the image processing apparatus 1 is turned on, the power source switching unit 101 performs control so as to select the commercial power source 100 for the power supply (Step S301). The energy-saving control unit 112 then transitions the power state of the apparatus to the standby state 202 (Step S302).

Next, the main controller 104 determines whether or not a job for the apparatus has been detected (Step S303). When it is determined that a job has been detected (Step S303: Yes), the energy-saving control unit 112 transitions the standby state 202 of the apparatus to the normal operation state 201 (Step S304). The main controller 104 then instructs a predetermined unit to execute the received job (scanning, copying, printing, fax, or the like) (Step S305). The main controller 104 then determines whether or not the received job has been completed (Step S306). The job is repeatedly executed at Step S305 (Step S306: No) until it is completed. Meanwhile, when it is determined that the job has been completed (Step 5306: Yes), the main controller 104 returns to Step 5302 so that the normal operation state 201 of the apparatus transitions to the standby state 202.

When it is determined that a job has not been detected (Step S303: No), the main controller 104 determines whether or not the waiting-mode transition condition is satisfied, e.g., no inputs have been received for a certain period of time, or the energy-saving button of the operating unit 107 has been pressed (Step S307). When it is determined that the waiting-mode transition condition is not satisfied (Step S307: No), the process returns to Step S303. When it is determined that the waiting-mode transition condition is satisfied (Step S307: Yes), the main controller 104 transitions the standby state 202 of the apparatus to the waiting mode 203 (Step S308). The main controller 104 then determines whether or not the return condition is satisfied, e.g., the energy-saving button of the operating unit 107 has been pressed or a job has been received while the apparatus is in the waiting mode 203 (Step S309).

When it is determined that the condition for returning from the waiting mode 203 is satisfied (Step S309: Yes), the process returns to Step S302 so that the transition to the standby state 202 is made. Conversely, when it is determined that the condition for returning from the waiting mode 203 is not satisfied (Step S309: No), the stored electric-power amount detection unit 111 detects the amount of electric power currently stored in the electric storage unit 103. The power system switching unit 110 determines whether or not the power consumption of the apparatus in the waiting mode 203 can be met by using only the electric storage unit 103 (Step S310). This determination may be made by determining whether the amount of electric power stored exceeds a predetermined threshold or may be made by monitoring and measuring the power consumption, calculating a threshold on the basis of the measured power consumption, and determining whether or not the amount of electric power stored exceeds the threshold.

When it is determined that it is difficult to meet the power consumption by using only the electric storage unit 103 (Step S310: No), the process returns to Step S309 and the waiting mode 203 is retained. Conversely, when it is determined that it is possible to meet the power consumption by using only the electric storage unit 103 (Step S310: Yes), the power system switching unit 110 cuts off the electric power supply to any unnecessary units and transitions the power state to the energy-saving waiting mode 204 (Step S311). The power source switching unit 101 then receives a command from the power system switching unit 110 and then switches the supply source of the electric power from the commercial power source 100 to the electric storage unit 103 (Step S312). The stored electric-power amount detection unit 111 then constantly detects the amount of electric power stored in the electric storage unit 103 and, in accordance with the amount of electric power stored, the power system switching unit 110 determines whether or not it is possible to retain the energy-saving waiting mode 204 (Step S313). This is determined using the same method as that used at Step S310.

When it is determined that it is not possible to retain the energy-saving waiting mode 204, i.e., it is difficult to perform the operation of the apparatus with the amount of electric power stored in the electric storage unit 103 (Step S313: No), the power source switching unit 101 receives a command from the power system switching unit 110, selects the commercial power source 100 as the power supply source (Step S314), and then makes the transition to the waiting mode 203. Conversely, when it is determined that the energy-saving waiting mode 204 can be retained (Step S313: Yes), the power system switching unit 110 determines whether or not a job of a predetermined low operation (e.g., an operation on the operating unit 107, scanning, fax, network response, or the like) has been received while in the energy-saving waiting mode 204 (Step S315).

When it is determined that a job of a predetermined low operation has not been received while in the energy-saving waiting mode 204 (Step S315: No), the process returns to Step S313 and the determination is repeated. Conversely, when it is determined that a job of a predetermined low operation has been received while in the energy-saving waiting mode 204 (Step S315: Yes), the power system switching unit 110 transitions the power state of the apparatus to the energy-saving low-operation mode 206 (Step S316).

Next, as illustrated in FIG. 3B, the main controller 104 determines whether or not the type of job of a low operation for which the transition to the energy-saving low-operation mode 206 has been made is an operation on the apparatus that is directly performed by the user, e.g., an operation on the operating unit 107 or opening/closing of the pressure plate (Step S320). When it is determined that it is an operation directly performed by the user (Step S320: Yes), the energy-saving control unit 112 supplies the electric power to the operating unit 107 so as to start up the operating unit 107 (Step S321). This power supply is performed by the electric storage unit 103. The main controller 104 then determines whether or not an input has not been received from the user for a certain period of time via the started operating unit 107 (Step S322).

If an input has been received from the user (Step S322: No), the main controller 104 receives the input and, after the job to be executed by a low operation is selected by the user, stops the operating unit 107 (Step S323). Here, the electric power supplied to the operating unit 107 may be cut off, or a backlight may be simply turned off.

Next, the main controller 104 prevents a new low operation from being detected (Step S324) so that, while the low operation selected by the user is being executed, a different low operation is not performed. Alternatively, if the amount of electric power stored in the electric storage unit 103 is sufficient to perform multiple low operations, the job may be stored in order (hereafter, referred to as queueing) in the ROM/RAM 116 without overwriting and, after the first low operation is completed, the stored job may be performed. Furthermore, it is determined whether or not a low operation can be executed in parallel. In the case of a low operation that can be executed, the operation is allowed to be detected so that the operation may be executed in parallel. In this case, the job that is determined to be unexecutable in parallel may be subjected to the queueing that is described above. At Step S320, if the command for a low operation that does not include the direct operation of the user is received (Step S320: No), the process proceeds to Step S324.

Next, the main controller (measuring unit) 104 starts to measure how much power is consumed for the job when the low operation selected by the user is performed while the electric power is supplied from the electric storage unit 103 (Step S325). The energy-saving control unit 112 supplies electric power to the area where it is needed depending on the type of job of a low operation (Step S326). The main controller 104 causes the job of the low operation selected by the user to be executed (Step S327).

The main controller 104 repeats Step S327 (Step S328: No) until the job is completed. When it is determined that the job has been completed (Step S328: Yes), the setting that prevents a new low operation from being detected is canceled (Step S329). In the case of the queueing of jobs, even if the current job has been completed, it is not determined that the job has been completed. The next job is executed and, when it is determined that all of the jobs have been completed, the process proceeds to the next operation.

Meanwhile, if no input has been received from the user for a certain period of time although the operating unit 107 has been operated and started up (Step S322: Yes), the energy-saving control unit 112 determines that a low operation is not to be performed and turns off the power of the operating unit 107 (Step S330).

When the low operation has been completed as described above or when no job has been input for a certain period of time, the main controller 104 transitions the energy-saving low-operation mode 206 of the apparatus to the energy-saving waiting mode 204 (Step S331). At that time, the main controller 104 stops measuring the power consumption for the job and calculates the power consumption (Step S332). The main controller 104 determines whether or not the calculated power consumption is greater than the currently stored expected power consumption of the corresponding job of the low operation (Step S333) and, if the calculated power consumption is greater than the expected power consumption, updates the value of the expected power consumption (Step S334). The process then proceeds to Step S313 so that it is determined again whether or not the energy-saving waiting mode 204 can be retained.

Figure 4A:
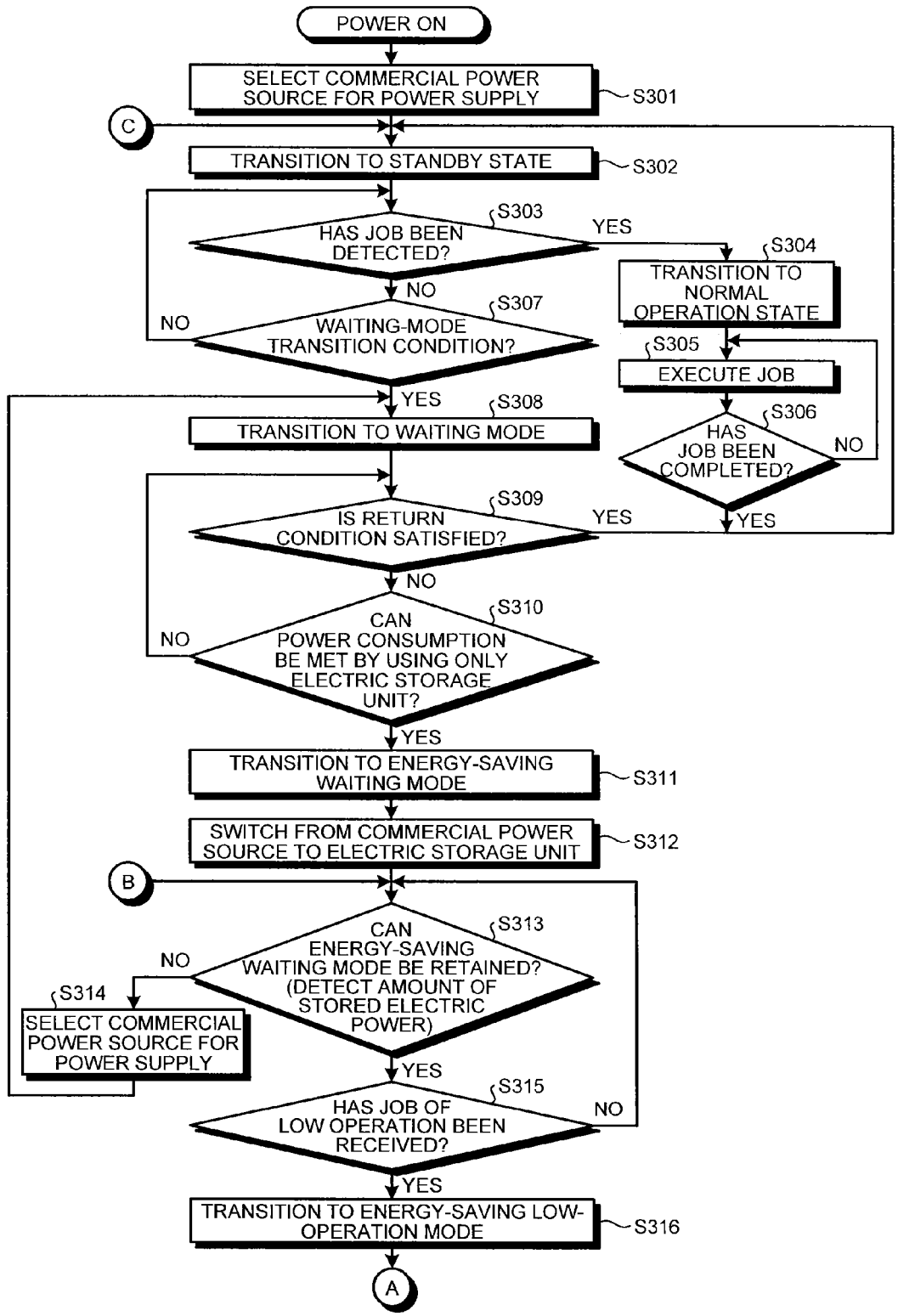
FIG. 4A is a diagram that illustrates the flow of the process to control a switchover of the power source in the image processing apparatus according to the embodiment in a case where the transition to the normal low-operation mode is provided.
Figure 4B:
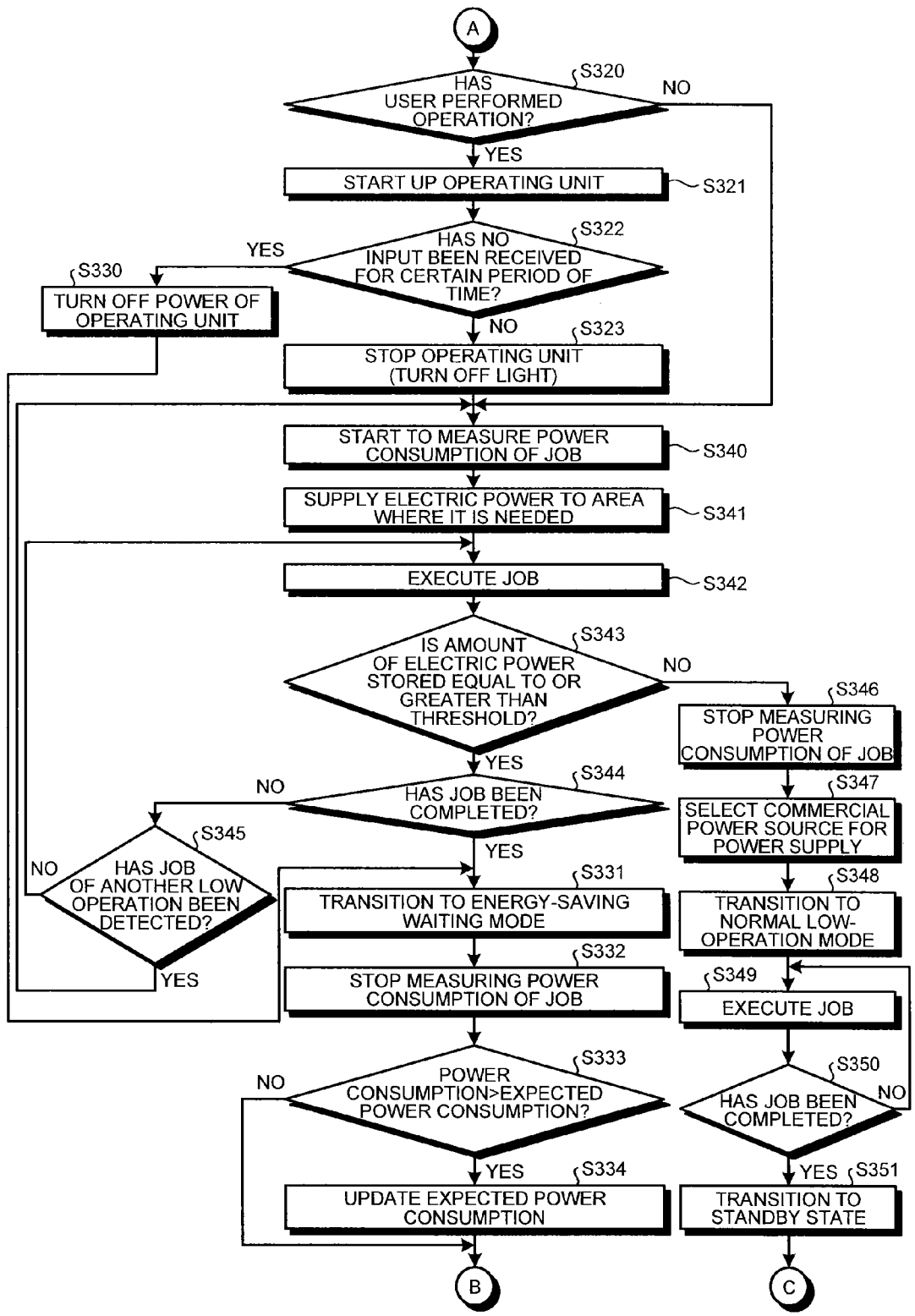
FIG. 4B is a diagram that illustrates the flow of the process to control a switchover of the power source in the image processing apparatus according to the embodiment in a case where the transition to the normal low-operation mode is provided.

There is a possible situation where the amount of electric power stored in the electric storage unit 103 becomes low while the low operation is being executed and the consumed power is not met by using only the power supply from the electric storage unit 103. An explanation is given, with reference to FIGS. 4A and 4B, of a case where the normal low-operation mode 207 is set, in which the commercial power source 100 is selected to supply the electric power in the above situation. The details of the operations of Steps S301 to S323 in FIGS. 4A and 4B are the same as those of FIGS. 3A and 3B; therefore, an explanation thereof is omitted. FIGS. 4A and 4B illustrate the process flow in which, if the command for a low operation is received while a different low operation is being executed, they are executed in parallel, instead of being queued.

As illustrated in FIG. 4A, when the operating unit 107 is stopped, the main controller 104 starts to measure how much power is consumed for a job when the low operation selected by the user is performed while the electric power is supplied from the electric storage unit 103 (Step S340). If jobs are executed in parallel, the power consumption of each of the jobs is separately measured. The main controller 104 supplies the electric power to the area where it is needed depending on the type of job of a low operation (Step S341).

The main controller 104 causes the job of a low operation selected by the user to be executed (Step S342).

Next, the main controller 104 determines whether or not the remaining amount of electric power stored in the electric storage unit 103 is equal to or greater than a predetermined threshold (Step S343). For example, the expected power consumption of a job of a low operation that is being executed may be used as a threshold. Furthermore, the degree of completion of a job may be estimated by using the time that has elapsed since the job was started, and the amount of electric power that is required to do the remaining work may be determined by using the degree of completion of the job, whereby a threshold may be calculated by using the expected power consumption and the amount of electric power. Because the value of the expected power consumption is not set when the apparatus is initially operated, a predetermined fixed value may be initially used. When it is determined that the amount of electric power stored is equal to or greater than the threshold (Step S343: Yes), the main controller 104 determines whether or not the job of the low operation selected by the user has been completed (Step S344). If multiple jobs are executed in parallel, a determination of Yes is made when all of the jobs have been completed.

When it is determined that the job has not been completed (Step S344: No), it is determined whether or not the job command of another low operation has been detected (Step S345). If it has not been detected (Step S345: No), the process proceeds to Step S342 so that the execution of the job of the low operation is continued. Conversely, if it has been detected (Step S345: Yes), the process proceeds to Step S340 so that the measurement of the power consumption of the newly detected job is started and the electric power is supplied to the device where it is needed. The process flow after the job has been completed (Step S344: Yes) is the same as the flow that is illustrated in FIG. 3B. If a new job is detected and if the detected job can be executed in parallel with the job that is being currently executed, the execution of the detected job may be allowed. If the detected job cannot be executed in parallel, the queueing may be performed.

Meanwhile, when it is determined that the amount of electric power stored is less than the threshold (Step S343: No), the main controller 104 stops measuring the power consumption of the low operation that is being executed (Step S346). The power source switching unit 101 then receives a command from the power system switching unit 110 and selects the commercial power source 100 to supply the electric power to the device that is operating for the job of the low operation (Step S347). At the same time, the main controller 104 transitions the power status to the normal low-operation mode 207 (Step S348). The main controller 104 then executes the job of the low operation (Step S349) and, until it is determined that the job has been completed, repeats Step S349 (Step S350). After all the jobs for the normal low operation have been completed, the main controller 104 finally transitions the power status of the apparatus to the standby state 202 (Step S351).

In the example of FIG. 4B, the time during which it is determined whether or not the transition to the normal low-operation mode 207 is to be made is limited to the time during which the job is executed; however, it may be determined whether or not the expected power consumption of the job is greater than the amount of electric power stored in the electric storage unit 103 before the job is executed, e.g., before Step S342. If the expected power consumption is greater than the amount of electric power stored, the process may proceed to Step S346 so that the transition to the normal low-operation mode 207 may be made.

Figure 5:
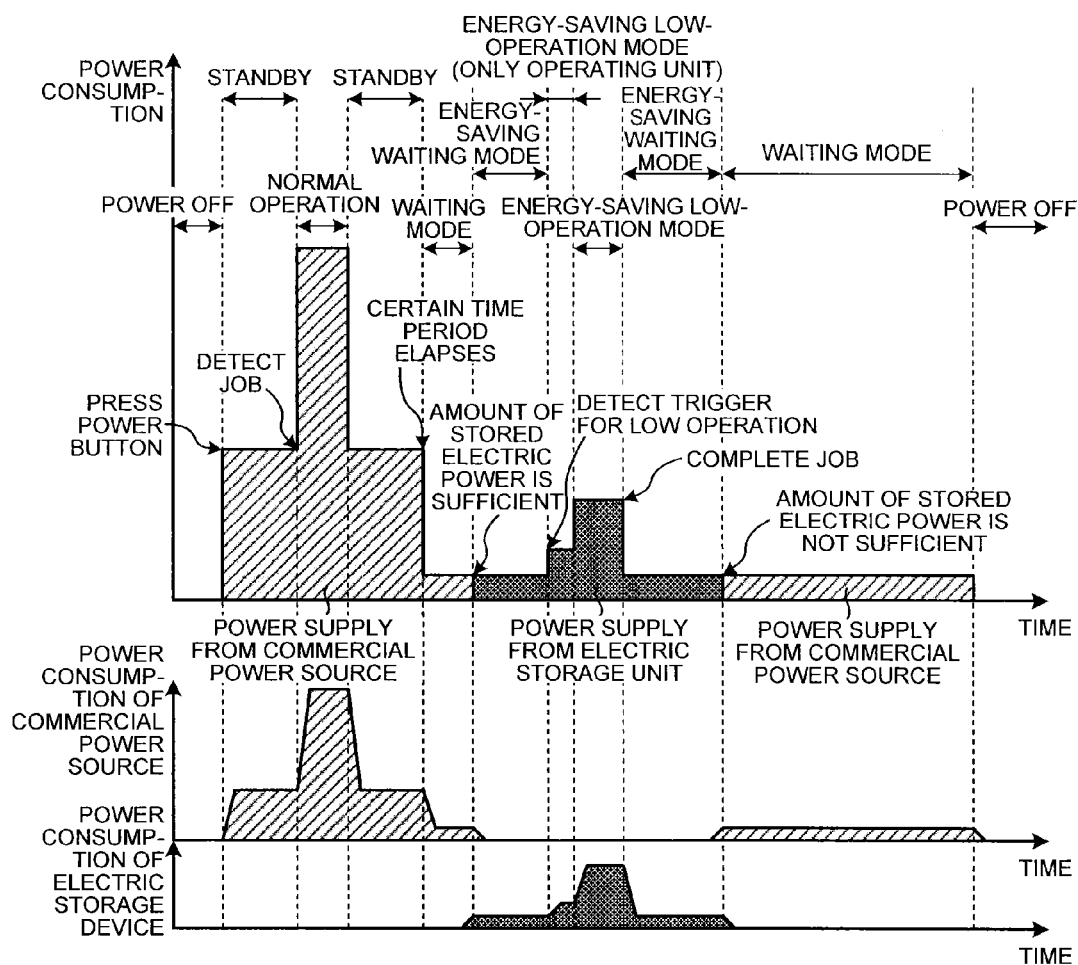
FIG. 5 is a diagram that illustrates the transition of the power consumption in the image processing apparatus according to the embodiment in a case where the transition to the normal power operation mode is not provided.
Figure 6:
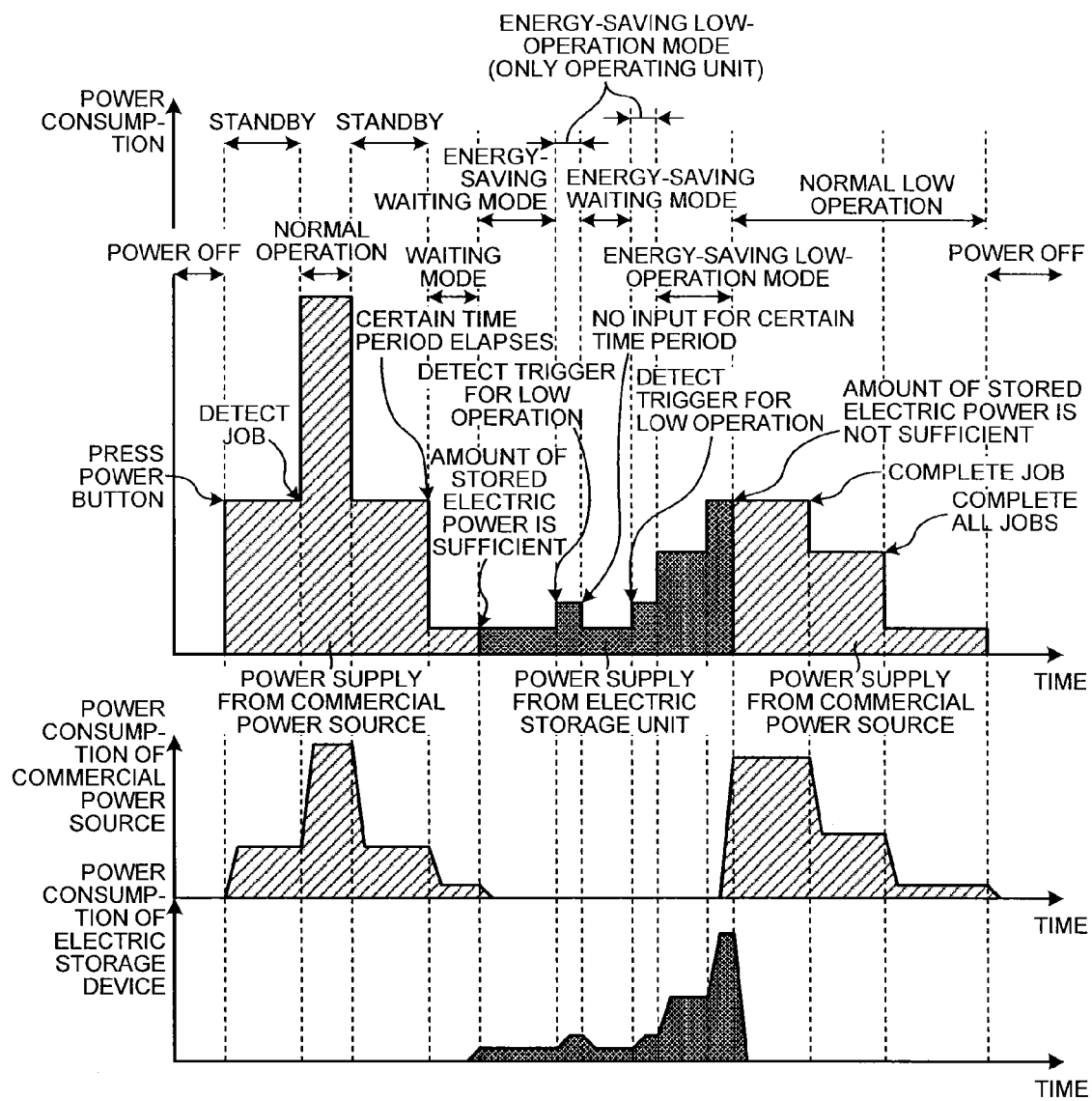
FIG. 6 is a diagram that illustrates the transition of the power consumption in the image processing apparatus according to the embodiment in a case where the transition to the normal power operation mode is provided.

An explanation is given of the power consumption of the commercial power source 100 and the electric storage unit 103 in each of the above-described power transition states. FIG. 5 illustrates a case where the transition to the normal low-operation mode 207 is not made. FIG. 6 illustrates a case where multiple requests for jobs are received and, when the amount of electric power stored in the electric storage unit 103 is insufficient, the transition to the normal low-operation mode 207 is made so that the operation is continued.

In FIG. 5, the power consumption of the electric storage unit 103 increases when, after the energy-saving waiting mode 204 transitions to the energy-saving low-operation mode 206, the electric current is applied to only the operating unit 107 and when an input of the operation is received from the operating unit 107 and then the job is performed. Meanwhile, in FIG. 6, the power consumption of the electric storage unit 103 gradually increases while in the energy-saving low-operation mode 206. This is because the jobs for the low operations are designated in parallel and the number of concurrently executed jobs is increased; therefore, the power consumption of the electric storage unit 103 increases in accordance with the increasing number of jobs. When the amount of electric power stored in the electric storage unit 103 is not enough and it is determined that it is difficult to retain the energy-saving low-operation mode 206 in accordance with the determination at Step S343, the process proceeds to Step S346 so that the transition to the normal low-operation mode 207 is made and the power supply from the commercial power source 100 is selected.

In the image processing apparatus 1 according to the above-described embodiment, in the case of a low operation that has low power consumption, the electric current is applied to only an appropriate section from the electric storage unit 103 to execute the job; therefore, it is possible to further achieve energy saving compared to the case where the electric current is applied from the commercial power source 100 with respect to all the jobs so that the jobs are executed.

Furthermore, it can be determined whether the job is to be executed by using the electric power supplied from the electric storage unit 103 or from the commercial power source 100 on the basis of the expected power consumption of the job; therefore, it is possible to prevent occurrence of a problem where a job cannot be performed due to the shortage of electric power supplied during the execution of a low operation.

In the case where the transition to the normal low-operation mode 207 is not made, one low operation is prevented from being executed while another low operation is being executed; thus, it is possible to prevent the power consumption from being greater than the amount of electric power stored in the electric storage unit 103, which is due to an unintended increase in the number of concurrently executed jobs for low operations.

If multiple jobs for low operations are executed in parallel, there is a possibility that the power consumption during the execution of the jobs becomes greater than the amount of electric power stored in the electric storage unit 103; therefore, a switchover is made to the power supply from the commercial power source 100 when the amount of electric power stored is less than a predetermined threshold. Thus, it is possible to prevent the occurrence of a problem where a job cannot be performed due to the shortage of electric power supplied during the execution of the low operation.

Furthermore, the expected power consumption is updated on a constant basis; therefore, even if the power consumption increases while the apparatus is in use, the accuracy is improved with which the amount of electric power needed for the job of a low operation is predicted.

A configuration may be such that each program to be executed by the information processing apparatus according to the present embodiment is stored in a computer connected via a network such as the Internet and provided by being downloaded via the network. Moreover, a configuration may be such that each program to be executed by the information processing apparatus according to the present embodiment is provided or distributed via a network such as the Internet.

A configuration may be such that each program to be executed by the information processing apparatus according to the present embodiment is provided such that it is installed in a ROM, or the like, in advance.

Each program to be executed by the information processing apparatus according to the present embodiment has a modular configuration that includes the above-described units. In terms of actual hardware, a CPU (processor) reads the program from the above-described storage medium and executes the read program so as to load the above-described units into a main storage device so that each of the units is generated in the main storage device.

A configuration may be such that each program to be executed by the information processing apparatus according to the present embodiment is provided by being stored, in the form of a file that is installable and executable, in a recording medium readable by a computer, such as a CD-ROM, a flexible disk (FD), a CD-R, or a digital versatile disk (DVD).

In the above-described embodiment, an explanation is given of a case where the image processing apparatus according to the present invention is used as a multifunction peripheral that has at least two functions of copying, printing, scanning, and facsimile functions; however, the image processing apparatus according to the present invention may be used as any image processing apparatus if they are copiers, printers, scanners, facsimile machines, or the like.

According to an aspect of the present invention, it is possible to further improve power saving.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus including
an electric-power generating circuit configured to generate electric power;
an electric storage configured to store therein the electric power generated by the electric-power generating circuit; and
a control circuit configured to select the electric storage or a commercial power source as an electric power source to supply electric power into the information processing apparatus, wherein
while in an energy-saving waiting mode in which the information processing apparatus is in a waiting state to wait for an input of a job, the control circuit selects the electric storage as the electric power source, when the input job is for a predetermined low operation, the control circuit supplies the electric power from the electric storage only to a section that is used for the predetermined low operation, the predetermined low operation being a single function operation including scanning, copying, printing or faxing, when the electric power stored in the electric storage is less than a predetermined threshold in an energy-saving low-operation mode, the electric power is supplied from the commercial power source, when the electric power stored in the electric storage is less than the predetermined threshold, the control circuit transitions from the energy-saving low-operation mode to a normal low-operation mode and the electric power is supplied from the commercial power source, when the electric power stored in the electric storage is not less than the predetermined threshold and the control circuit does not transition from the energy-saving low-operation mode to the normal low-operation mode thereby staying in the energy-saving low-operation mode, the control circuit prevents simultaneous execution of the predetermined low operation and a second low operation, when the input job is a job other than the job of the predetermined low operation, the control circuit selects the commercial power source as the electric power source, and the control circuit executes the input job by using a section to which the electric power is supplied from the electric storage or the commercial power source.

2. The information processing apparatus according to claim 1, further comprising a stored electric-power amount detection circuit configured to detect a remaining amount of electric power stored in the electric storage, wherein when an input of the job of the predetermined low operation is received and when an expected power consumption that is expected to be required for completion of the job of the predetermined low operation is less than the detected amount of electric power stored, the control circuit causes the electric storage to supply electric power only to a section that is used for the predetermined low operation and, when the expected power consumption is greater than the detected amount of electric power stored, selects power being supplied from the commercial power source.

3. The information processing apparatus according to claim 1, further comprising a stored electric-power amount detection circuit configured to detect a remaining amount of electric power stored in the electric storage, wherein the control circuit selects power being supplied from the commercial power source when the detected amount of electric power stored is less than the predetermined threshold while the job of the predetermined low operation is being executed.

4. The information processing apparatus according to claim 1, wherein, while in the energy-saving waiting mode, the control circuit causes the electric storage to supply electric power to an operating circuit when a user operates the operating circuit.

5. The information processing apparatus according to claim 2, further comprising a measuring circuit configured to store the expected power consumption of each job of the predetermined low operation, measure power consumption that occurs during execution of the predetermined low operation and, when the stored expected power consumption is larger than the power consumption, update a value of the expected power consumption with a value of the power consumption, and store the updated value of the power consumption.

6. The information processing apparatus according to claim 1, wherein, while the job of the predetermined low operation is being executed, the control circuit receives a different job and stores the different job without overwriting and, when the job being executed is completed, executes the stored different job.

7. The information processing apparatus according to claim 1, wherein, when the control circuit receives a different job while the job of the predetermined low operation is being executed, the control circuit determines whether or not the different job is executable in parallel with the job of the predetermined low operation that is being executed and, when execution is possible, executes the different job and, when execution is not possible, receives and stores the different job without overwriting and, when the job being executed is completed, executes the stored different job.

8. A power-source switching method performed by an information processing apparatus including
an electric-power generating circuit configured to generate electric power;
an electric storage configured to store therein the electric power generated by the electric-power generating circuit; and
a control circuit configured to select the electric storage or a commercial power source as electric power source to supply electric power into the information processing apparatus,
the power-source switching method comprising:
while in an energy-saving waiting mode in which the information processing apparatus is in a waiting state to wait for an input of a job, selecting, by the control circuit, the electric storage as the electric power source,
when the input job is for a predetermined low operation, supplying, by the control circuit, the electric power from the electric storage only to a section that is used for the predetermined low operation, the predetermined low operation being a single function operation including scanning, copying, printing or faxing,
when the electric power stored in the electric storage is less than a predetermined threshold in an energy-saving low-operation mode, supplying, by the control circuit, the electric power from the commercial power source,
when the electric power stored in the electric storage is less than the predetermined threshold, transitioning, by the control circuit, from the energy-saving low-operation mode to a normal low-operation mode and supplying, by the control circuit, the electric power from the commercial power source,
when the electric power stored in the electric storage is not less than the predetermined threshold and the control circuit does not transition from the energy-saving low-operation mode to the normal low-operation mode thereby staying in the energy-saving low-operation mode, preventing, by the control circuit, simultaneous execution of the predetermined low operation and a second low operation,
when the input job is a job other than the job of the predetermined low operation, selecting, by the control circuit, the commercial power source as the electric power source, and
executing, by the control circuit, the input job by using a section to which the electric power is supplied from the electric storage or the commercial power source.

* * * * *